(12) United States Patent
Quinn

(10) Patent No.: US 8,078,160 B2
(45) Date of Patent: Dec. 13, 2011

(54) WIRELESS NETWORK NOTIFICATION, MESSAGING AND ACCESS DEVICE

(76) Inventor: Kenneth Ray Quinn, Saskatoon (CA)

(*) Notice: Subject to any disclaimer, the term of this patent is extended or adjusted under 35 U.S.C. 154(b) by 616 days.

(21) Appl. No.: 12/192,998

(22) Filed: Aug. 16, 2008

(65) Prior Publication Data

US 2009/0047974 A1    Feb. 19, 2009

Related U.S. Application Data

(60) Provisional application No. 60/956,678, filed on Aug. 17, 2007.

(51) Int. Cl.
*H04W 24/00* (2009.01)

(52) U.S. Cl. ........ 455/425; 455/411; 455/434; 455/515; 370/328

(58) Field of Classification Search .................. 455/425, 455/411; 370/328, 401, 329, 338
See application file for complete search history.

(56) References Cited

U.S. PATENT DOCUMENTS

| | | | | |
|---|---|---|---|---|
| 7,231,456 B1* | 6/2007 | Chiba et al. | ................. | 709/236 |
| 2003/0039260 A1* | 2/2003 | Fujisawa | ...................... | 370/401 |
| 2007/0030824 A1* | 2/2007 | Ribaudo et al. | ............... | 370/328 |
| 2009/0180651 A1* | 7/2009 | Hilpisch et al. | ............... | 381/315 |
| 2009/0232082 A1* | 9/2009 | Bidichandani et al. | ....... | 370/329 |

OTHER PUBLICATIONS

"IEEE Standard for Information technology—Telecommunications and information exchange between systems—Local and metropolitan area networks—Specific requirements—Part 11: Wireless LAN Medium Access Control (MAC) and Physical Layer (PHY) Specifications" IEEE std 802.Nov. 2007, Jun. 12, 2007.*

* cited by examiner

*Primary Examiner* — Kamran Afshar
*Assistant Examiner* — Shahriar Behnamian
(74) *Attorney, Agent, or Firm* — Schubert Law Group PLLC; Neil K. Cohen

(57) ABSTRACT

A wireless device having capabilities to receive identification signals from other wireless devices identifies specific wireless devices by said transmitting devices maximum set identification field. Once the transmitting device is identified as having its maximum length identifier set the receiving device may further allow access or data transfer to an alternate network using the contents of the maximum length identifier and/or MAC address of the transmitting device. The wireless devices may conform to the widely popular IEEE 802.11x specifications.

16 Claims, 5 Drawing Sheets

WIRELESS NETWORK NOTIFICATION, MESSAGING AND ACCESS DEVICE

CROSS REFERENCE TO A PROVISIONAL APPLICATION

This patent application claims priority on Provisional Application Ser. No. 60/956,678 filed on Aug. 17, 2007

BACKGROUND OF THE INVENTION

This invention generally relates to wireless devices, local area networks (LANs) and wireless local area networks (WLANs) which may include connection to the Internet.

WLANs in common use include a station device (STA) and an access point (AP). The STA's associate with an AP to receive connectivity to a LAN and/or the Internet. The protocols used for these connections are described in IEEE 802.11x specifications. This document describes a wireless LAN Medium Access Control (MAC) layer which includes a service set identifier (SSID).

On power up a STA will scan for beacon signals from an AP or will send a probe request signal. APs in range of the probe request will respond with a probe response signal. If the SSID of the STA is authorized by the AP and further association requirements such as a shared network key are met then authentication can be completed and the STA receives access to the LAN or Internet. This WLAN as described in IEEE 802.11x documents is widely used throughout the world today. It provides for association, authentication and network access for WLAN devices.

The novel device disclosed in this patent provides useful improvement to the WLAN functionality. It provides messaging, notifications and/or network access to STA's on a predetermined basis such that an IEEE 802.11x compliant STA device can be used for a multitude of useful alternative functions such as; home/commercial security alarms, personal safety/health devices, personal/object locating, presence, instant messaging, web access, VOIP, utility meter reading, product level tracking such as vending machines, water coolers etc.

Presently many of the described alternative functions depend on cellular (celemetry) or radio technologies (telemetry), although these technologies do prove adequate they depend on costly cellular or radio devices as well as a closed cellular/radio infrastructure which in most instances have access and usage fees that are high and sometimes cost prohibiting.

It should be noted that a STA device described herein needs only the ability to send a probe request or beacon signal with a SSID according to IEEE 802.11x protocol to function with the disclosed invention.

It is an object of this invention to provide a low cost, widely accessible alternative to the cellular or present radio infrastructure for messaging and access control.

SUMMARY

In one embodiment of the present invention a wireless receiving device receives all 802.11x beacon signals and probe request signals within reception range from 802.11x compliant transmitters. Each signal is examined to see if its SSID is the maximum length 32 octets. If it has a SSID of 32 octets it is identified as a maximum identification compliant client and further data processing can occur. If the SSID of the signal is less than 32 octets it is discarded and no further action is taken regarding this 802.11x transmitting device.

If a maximum identification compliant client is recognized the wireless receiving device can continue to process the client identification information for further functionality. The receiving device can use the SSID content and/or the MAC address for further identification, access, notification and/or data transfer using an alternate network such as the Internet.

DETAILED DESCRIPTION OF THE INVENTION

Figure 1:
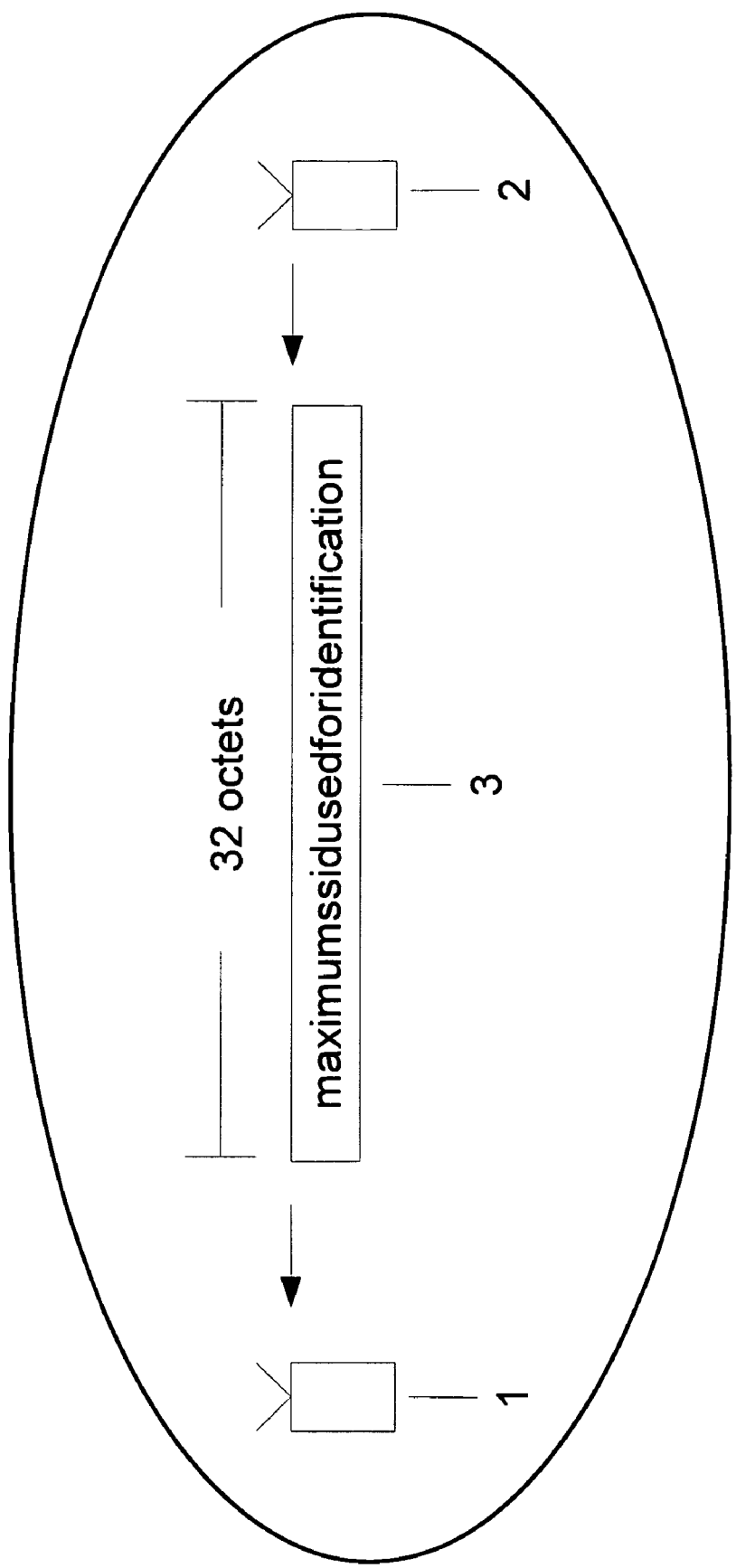
FIG. 1 is showing disclosed wireless device receiving a maximum length 32 octet SSID from a transmitting device according to IEEE 802.11x specifications.

Referring to FIG. 1 the wireless receiving device 1 receives signals from in range wireless transmitter 2. The wireless transmitter 2 is sending either a probe request or a beacon signal. The probe request is normally sent by a Station (STA) and the beacon signal is usually sent by an Access Point (AP) but according to the IEEE 802.11x specifications both send the Service Set Identifier (SSID) 3 so as to identify a compatible device. It makes no difference if an AP is used as a transmitting STA because the receiving device 1 is listening for the SSID with no regard to the type of transmitting device 2. The signal contains a maximum set 32 octet SSID 3. The IEEE 802.11x specifications allows for a 0 to 32 octet SSID. The receiving device 1 recognizes the transmitting device 2 by its maximum set 32 octet SSID 3. It should be noted that any IEEE 802.11x compliant transmitting device in range can send a signal containing an SSID but only one with a maximum 32 octets will be identified as a maximum set SSID transmitting device by the receiving device 1.

Figure 2:
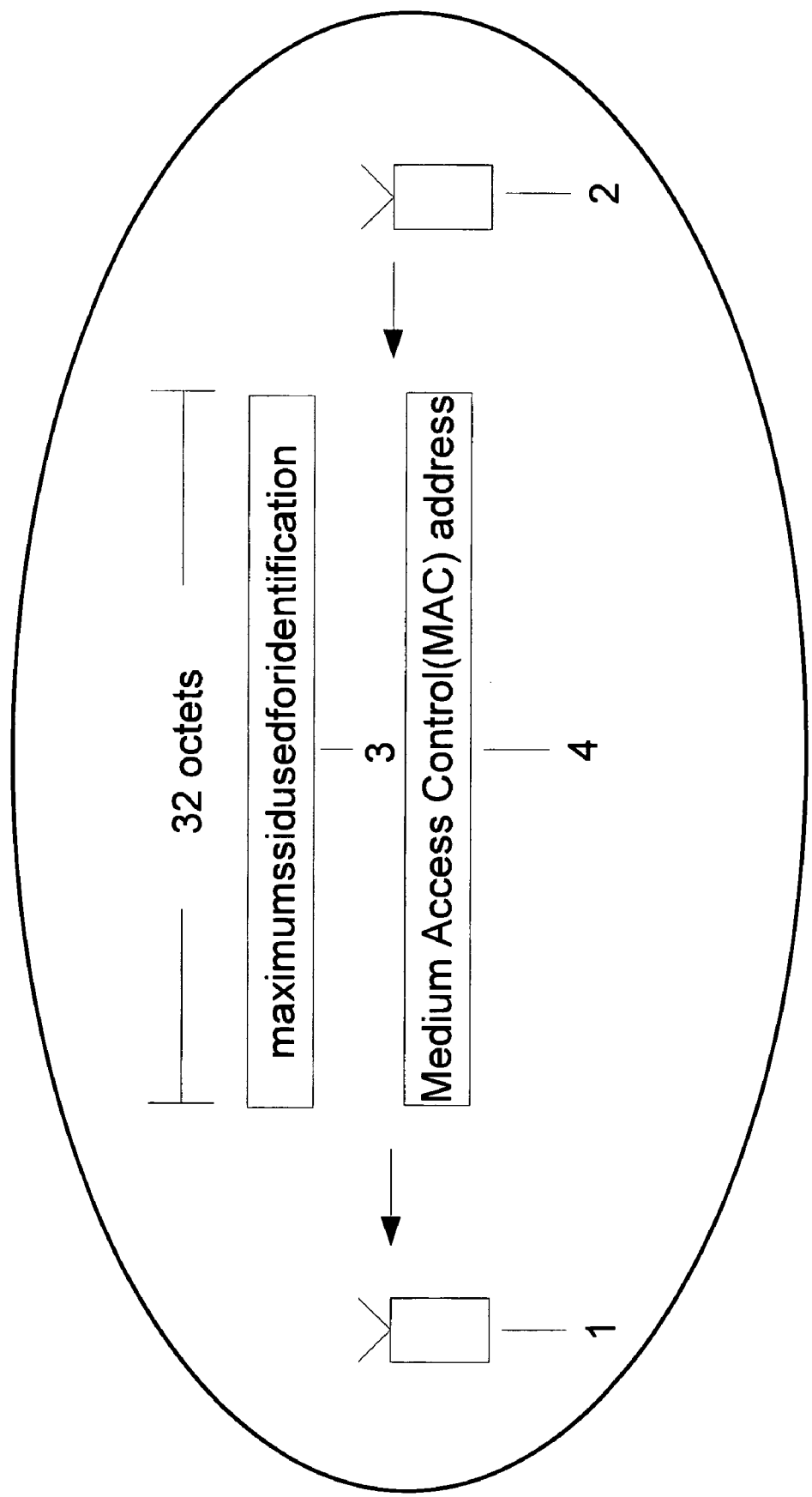
FIG. 2 is showing disclosed wireless device receiving a maximum length 32 octet SSID and the Medium Access Control (MAC) address of the transmitting device according to IEEE 802.11x specifications.

With reference now to FIG. 2 the receiving device 1 identifies the transmitting device 2 by its maximum set 32 octet SSID 3 and its Medium Access Control (MAC) address. It is to be understood that the MAC address is unique to the transmitting device 2, allowing receiving device 1 to firstly identify the transmitting device 2 as a maximum set SSID transmitting device and further recognize the transmitting device specifically by its MAC address 4. The maximum set SSID 3 can be any combination of ASCII characters. It is not necessary for the wireless receiving device 1 to have any knowledge of the contents of the SSID 3. This allows for a vast network of transmitters to securely access and function with the wireless receiving device 1. It also allows for a key to be placed in the SSID 3 of the wireless transmitter 2 restricting unlawful access.

Figure 3:
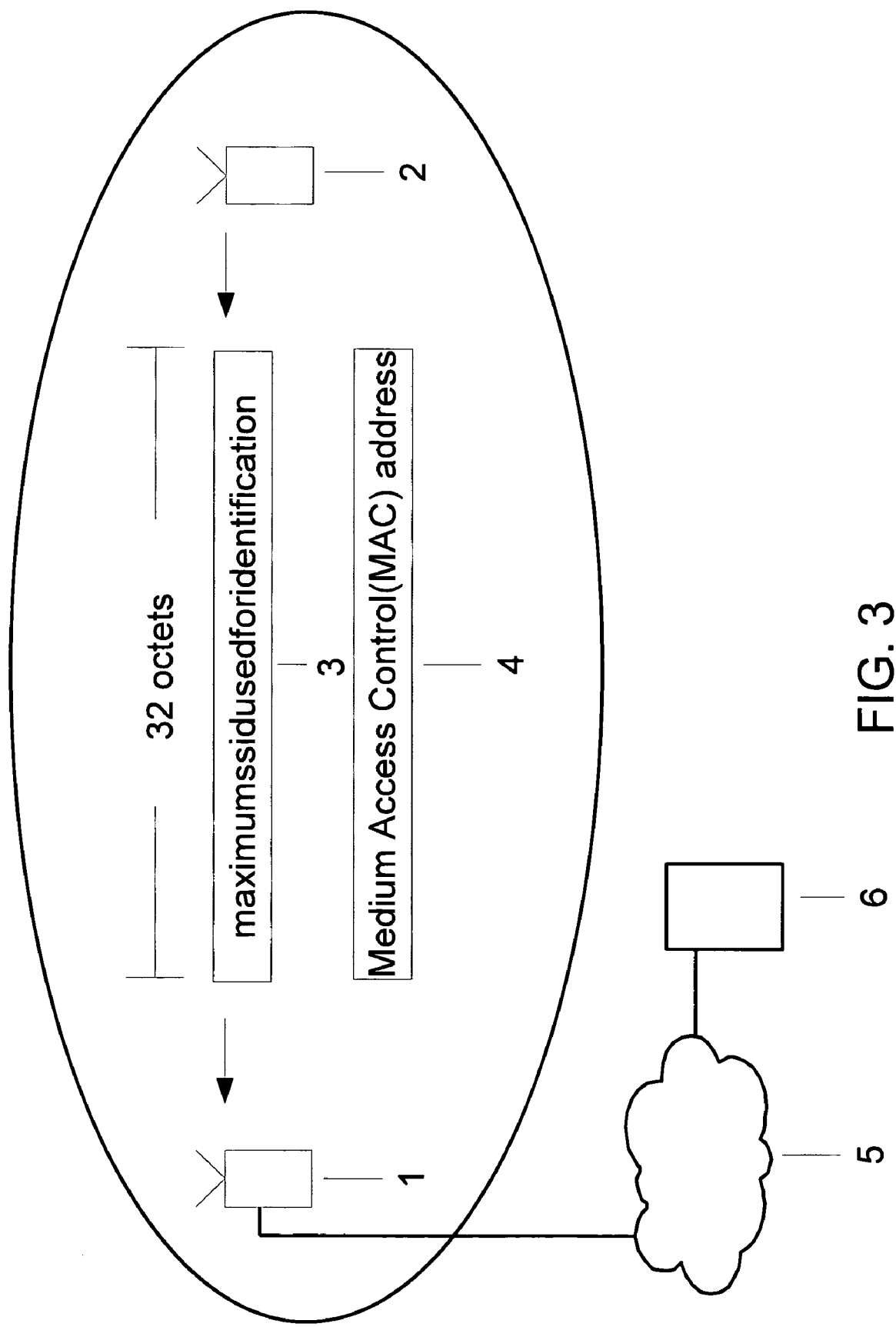
FIG. 3 is showing disclosed wireless device receiving a maximum length 32 octet SSID and the Medium Access Control (MAC) address of the transmitting device according to IEEE 802.11x specifications and having means to access servers across alternate networks including the Internet.

With reference now to FIG. 3 the wireless receiving device 1 having connectivity to the Internet 5 gains access to server 6. In one embodiment of the present invention the wireless receiving device 1 receives maximum set SSID 3 and MAC address 4 from wireless transmitting device 2, and wireless receiving device 1 sends said information over the Internet 5 to server 6. Server 6 is able to identify wireless transmitting device 2 by its unique MAC address 4. It also has 32 octets of content in maximum set SSID 3 which can be used for security purposes and data reception.

One practical example of this is a wireless transmitting device 2 connected to a home security alarm. When the home security alarm is activated the wireless transmitting device 2 sends a probe request signal including maximum set SSID 3 and MAC address 4. This information is received by wireless receiving device 1 and sent over the Internet 5 to Server 6. Server 6 now identifies the location of the alarm signal using MAC address 4 and content of maximum set SSID 3 and uses said content for information such as type of alarm (smoke, burglar, low temperature etc.) and zone of activation. Server 6 can then take the appropriate action as necessary such as alerting resident, police, emergency services etc.

It must be noted that in this embodiment wireless receiving device 1 need not be located at the same premise as wireless transmitting device 2, allowing for a neighbor with wireless transmitting device 1 to receive signals from wireless transmitting device 2. This effectively prevents telephone wire cutting from stopping signals reaching a monitoring station.

Figure 4:
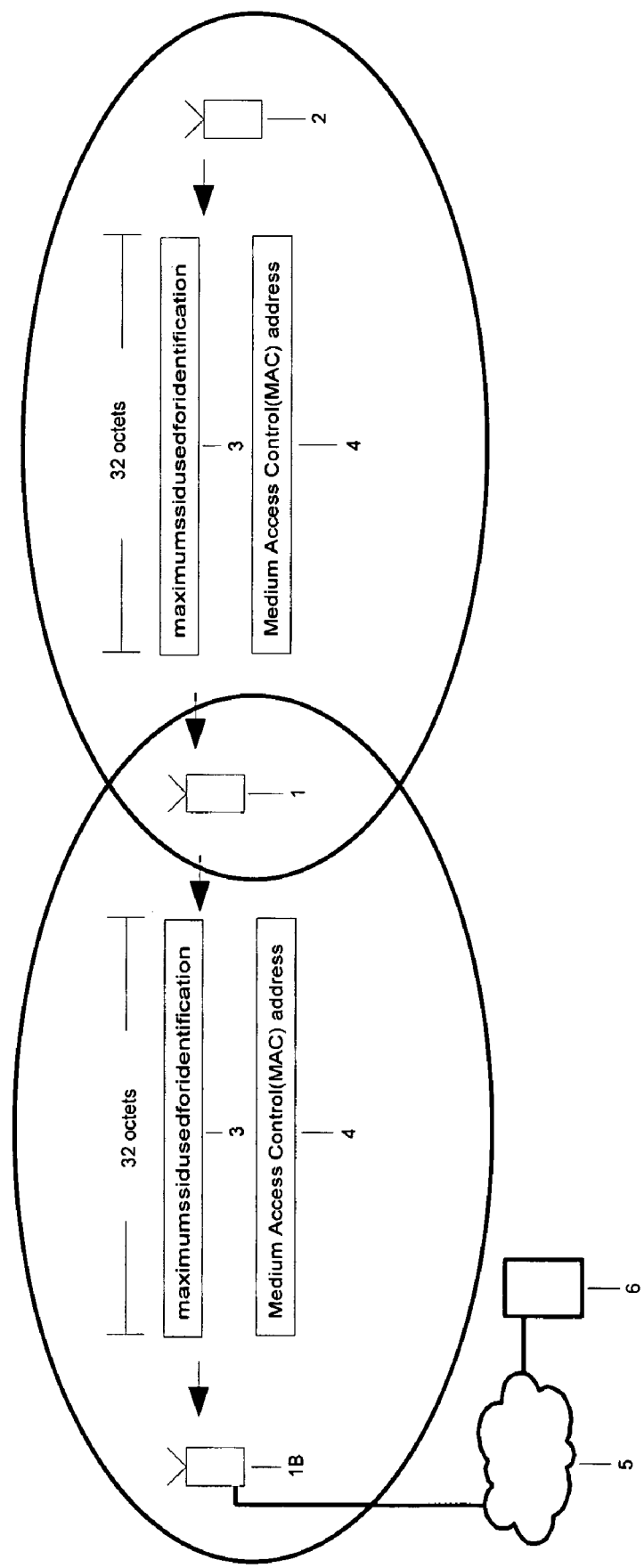
FIG. 4 is showing disclosed first wireless device receiving a maximum length 32 octet SSID from a transmitting device according to IEEE 802.11x specifications and forwarding original SSID and MAC address of transmitting device to alternate second wireless receiving device in range of said first wireless device and said second device having access to alternate network based servers over alternate networks including the Internet.

With reference now to FIG. 4 the wireless receiving device 1 forwards the maximum set SSID 3 and the MAC address 4 of wireless transmitting device 2 to wireless receiving device 1B. Wireless receiving device 1B having access to the Internet 5 sends received maximum set SSID 3 and MAC address 4 to server 6. This configuration allows wireless receiving device 1 and wireless receiving device 1B to form a mesh type network whereby wireless receiving device 1 does not need access to the Internet 5 but relies on wireless receiving device 1B for Internet access.

A practical example of this is said home alarm system that is activated at a premise whereby the signal hops from wireless receiving device to wireless receiving device until Internet access is available. When Internet access becomes available, the wireless receiving devices can stop transmitting the said signal.

Figure 5:
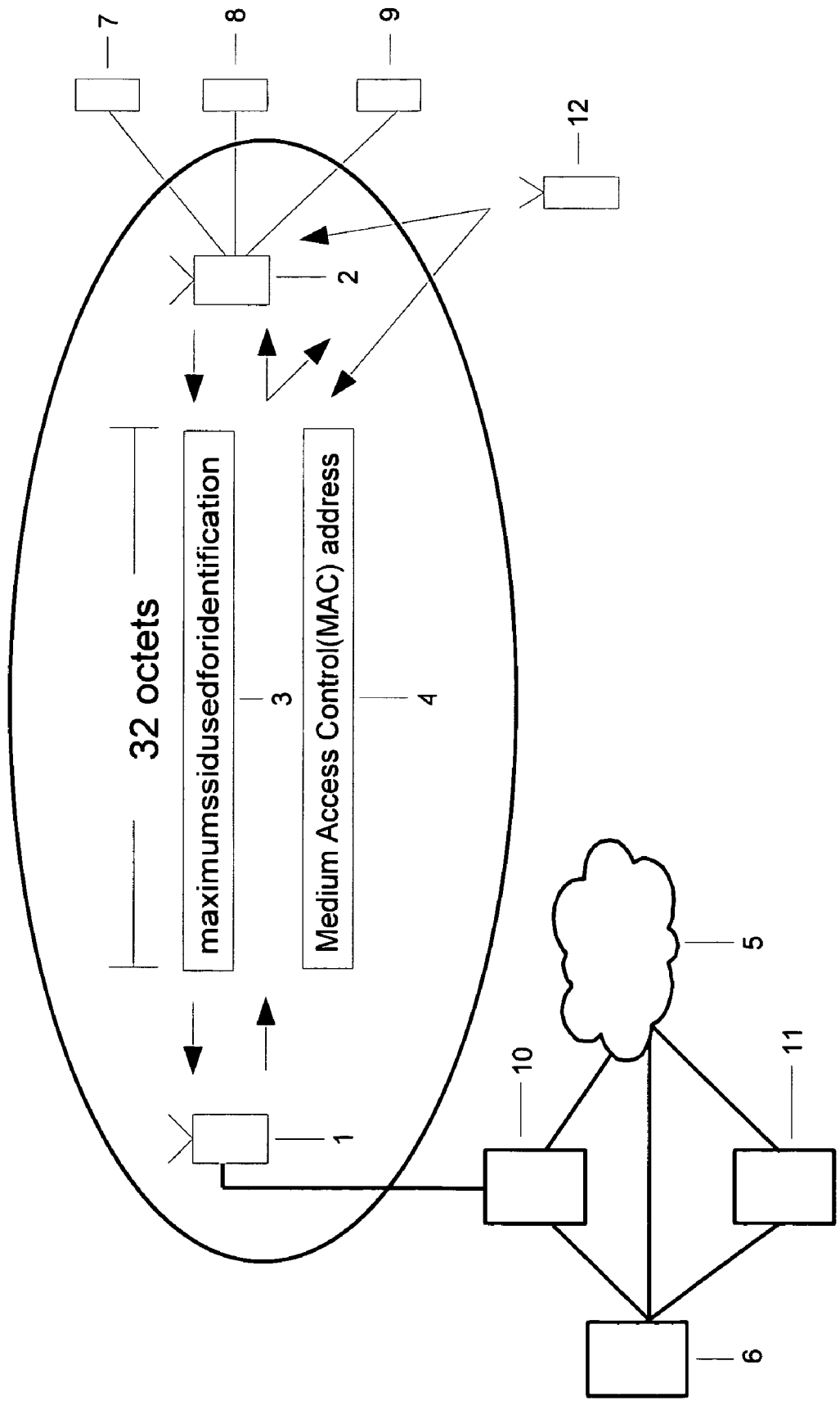
FIG. 5 is showing independent end use devices including wireless end use devices connected to a wireless transmitting device. This configuration allows for end use devices to transmit unique maximum 32 octet SSID content and unique MAC addresses to disclosed wireless receiving device. This configuration includes disclosed receiving device having capabilities of bi-directional data transfer allowing for message notification and network access capabilities including VOIP, messaging, e-mail, web and Mapping applications.

With reference now to FIG. 5 the aforementioned configuration includes end use devices 7, 8, 9. These devices may include said home security system, vending machines, utility meters, personal security/health alarms, object/personal locating devices with GPS positioning co-ordinates etc. In this configuration the end use devices 7, 8, 9 add data content to maximum length 32 octet SSID field wherein said SSID field contains specific data content regarding said end use device such as type of alarm notification, product levels, meter readings, and location coordinates. Server 6 is able to identify the end use device by its MAC address 4 and process data content specific to the end use devices 7, 8, 9.

FIG. 5 also includes bi-directional access granted to end use devices 7, 8, 9 and 12. Wireless receiving device 1 may further function as an access control device verifying wireless transmitting device 2 by its maximum length SSID 3 and its MAC address 4, the wireless receiving device 1 having capabilities to query server 6 over the Internet 5, authorizing wireless transmitting device 2's access to the Internet 5.

A practical example of this may be an end use device having VOIP capabilities and thus access to the Internet 5. The access to the Internet may be for web browsing, e-mail, instant messaging etc.

FIG. 5 further includes Server 6 having capabilities of forwarding geographical co-ordinates of end use device 7, 8 or 9 obtained from content of maximum set 32 octet SSID and MAC address of said devices to end user graphical mapping application 10 such as Google maps.

FIG. 5 includes a presence capability such that Server 6 having obtained presence information from maximum set 32 octet SSID and MAC address of end use devices 7, 8, 9 or 12 sends presence information to end user presence capable applications.

A practical example of this configuration is a home security alarm transmitting an away status of home occupant in response to a home security system that has been activated and an available presence when the home alarm system is deactivated. Server 6 sends said content information to a VOIP based end user application such that the end user application 11 is continually aware of the presence of the home occupant without the home occupant manually activating presence status. This would be especially useful for parents to monitor children's presence in the home.

Also in reference to FIG. 5 it should be noted that wireless transmitting device 2 and end use device 7, 8, 9 and 12 may possibly be a mobile device such as a cell phone, PDA, GPS etc. This configuration allows for mobile presence and/or location of persons or objects.

An example of this may be a person with a 802.11x enabled cell phone 12 or PDA 12 with a maximum set 32 octet SSID such that whenever said cell phone 12 or PDA 12 is in range of disclosed receiving device 1 said receiving device sends said identification information to Server 6 and further to graphical mapping application 10 or presence application 11.

It should also be noted that if an end use device is a mobile device 12 such as a cell phone then the next fixed placed wireless device such as the wireless transmitter 2 or the wireless receiving device 1 may send its own MAC address thereby allowing very close approximation of wireless mobile devices location. This enables parents to locate children with cell phones, PDA's etc. It also enables the locating of vehicles, objects etc.

The invention has been presented in specific embodiments to aid in the understanding of the details of the device and its operation. Such references to specific embodiments are not intended to limit the scope of the claims appended hereto. It will be apparent to those skilled in the art that modifications of such specific embodiments may be made without departing from the scope and spirit of the invention. Further it will be apparent to those skilled in the art that specific embodiments of said invention are presented with IEEE 802.11x specifications and as such are representative of present and future wireless specifications that allow maximum length variable identification fields to be set.

I claim:
1. A wireless receiving device to:
receive from a wireless transmitting device a wireless transmission pursuant to a protocol providing a variable length identification field (protocol identification field), the protocol identification field having a maximum length under the protocol;

compare the length of the value of the identification field of the transmission (transmission identification field) with the maximum length of the protocol identification field;

if the length of the transmission identification field is not equal to the maximum length of the protocol identification, discontinue the processing of the wireless transmission; and if the length of the transmission identification field is equal to the maximum length of the protocol identification field, determine whether to continue processing the wireless transmission, based upon one or more of:
contents of the transmission identification field; and
the Medium Access Control (MAC) address of said wireless transmitting device;

wherein said wireless receiving device having alternate network access allows said wireless transmitting device access to the alternate network based the determination to continue processing.

2. The wireless receiving device of claim 1, wherein said alternate network access is provided by a similar in range receiving device providing a mesh network environment.

3. The wireless receiving device of claim 1, wherein said alternate network access is the Internet.

4. The wireless receiving device of claim 1 wherein said wireless receiving device having alternate network access transmits data information received from said contents to one or more computing devices connected to said alternate network.

5. The wireless receiving device of claim 1, wherein the protocol identification field is a Service Set Identifier (SSID) described by an IEEE 802.11x protocol.

6. The wireless receiving device of claim 1, wherein the maximum length of the protocol identification field is 32 octets as described by an IEEE 802.11x protocol.

7. The wireless receiving device of claim 1, wherein said protocol identification field is part of a probe request/response signal or a beacon signal described by an IEEE 802.11x protocol.

8. The wireless receiving device of claim 1, having capabilities of a wireless access point and/or wireless router.

9. The wireless receiving device of claim 1, wherein:
the wireless receiving device is connected to said alternate network;
the protocol identification field is an SSID;
the wireless receiving device is to obtain location specific geographical co-ordinates from content of an SSID of the wireless transmission and/or from the MAC address of the wireless transmitting device; and
the wireless receiving device is to send location specific geographical co-ordinates over said alternate network.

10. The wireless receiving device of claim 1, wherein:
the wireless receiving device is 7 connected to
said alternate network;
the protocol identification field is an SSID;
the wireless receiving device is to obtain presence status data from content of the SSID and/or from the MAC address of the wireless transmitting device; and
the wireless receiving device is to send presence status data over the second network status to an end user presence applications.

11. The wireless receiving device of claim 2, wherein said wireless receiving device, upon recognition of the wireless transmitting device as a mobile device, is to contact a fixed location wireless device to obtain a location mapping of said mobile device and to set a location identification of the wireless receiving device to correspond to the fixed location wireless device.

12. The wireless receiving device of claim 1, wherein the wireless receiving device is to extract information encoded in the transmission identification field, the information comprising one or more elements selected from the group consisting of:
a key within the transmission identification field;
a type of alarm notification;
a zone of activation of alarm;
product levels;
meter readings;
geographical information; and
presence information about whether an occupant is present in a building.

13. A method of wireless communications, the method comprising:
receiving a wireless transmission pursuant to a protocol providing a variable-length identification field (protocol identification field), the identification field having a maximum length under the protocol;
comparing the length of the identification field of the wireless transmission (transmission identification field) with the maximum length of protocol identification field;
if the length of the transmission identification field is not equal to the maximum length of the protocol identification, discontinuing the processing of the wireless transmission; and
if the length of the transmission identification field is equal to the maximum length of the protocol identification field, determining whether to continue processing the wireless transmission, based upon one or more of:
contents of the transmission identification field; and
the Medium Access Control (MAC) address of said wireless transmitting device;
wherein said wireless receiving device having alternate network access allows said wireless transmitting device access to the alternate network based the determination to continue processing.

14. A wireless transmitting device to:
transmit to a wireless receiving device connected to an alternate network wireless messages pursuant to a protocol providing a variable-length identification field (the protocol identification field), the protocol identification field having a maximum length under the protocol;
insert in the wireless transmissions values of the identification field, wherein:
the wireless transmitting device comprises a wireless end use device;
the length of the values of the identification field in the transmissions is the maximum length under the protocol; and
the values of the identification field comprise data content, the data content comprising one or more elements selected from the group consisting of:
a key within a value of the identification field;
a type of alarm notification;
a zone of activation of alarm;
product levels;
meter readings;
geographical information; and
presence information about whether an occupant is present in a building, and
the data content is to be sent over the alternate network by the wireless receiving device, based upon the length of the values of the identification field equaling the maximum length of the identification field under the protocol.

15. The wireless transmitting device of claim 14, wherein:

the protocol identification field is a Service Set Identifier (SSID) described by an IEEE 802.11x protocol;

the maximum length of the protocol identification field is 32 octets; and the identification field in the transmissions is part of a probe request/response signal or a beacon signal.

16. The wireless transmitting device of claim 14, wherein the alternate network is the Internet.

* * * * *